(No Model.)

R. M. DIXON.
VALVE.

No. 525,680.  Patented Sept. 4, 1894.

Witnesses
Louis G. Julihn.
Eric G. Julihn.

Inventor
R. M. Dixon,
by Hopkins & Atkins.
Attorneys.

UNITED STATES PATENT OFFICE.

ROBERT MUNN DIXON, OF EAST ORANGE, NEW JERSEY, ASSIGNOR TO THE SAFETY CAR HEATING AND LIGHTING COMPANY, OF NEW YORK, N. Y.

VALVE.

SPECIFICATION forming part of Letters Patent No. 525,680, dated September 4, 1894.

Application filed October 18, 1892. Serial No. 449,263. (No model.)

*To all whom it may concern:*

Be it known that I, ROBERT MUNN DIXON, of East Orange, county of Essex, and State of New Jersey, have invented certain new and useful Improvements in Valves, of which the following is a specification, reference being had to the accompanying drawings.

The object of my invention is to produce an improved valve for use in connecting steam pipes, whereby the amount of steam passing through the valve may be graduated to a nicety, and by which the durability of the valve is considerably increased.

Figures 1, 2:
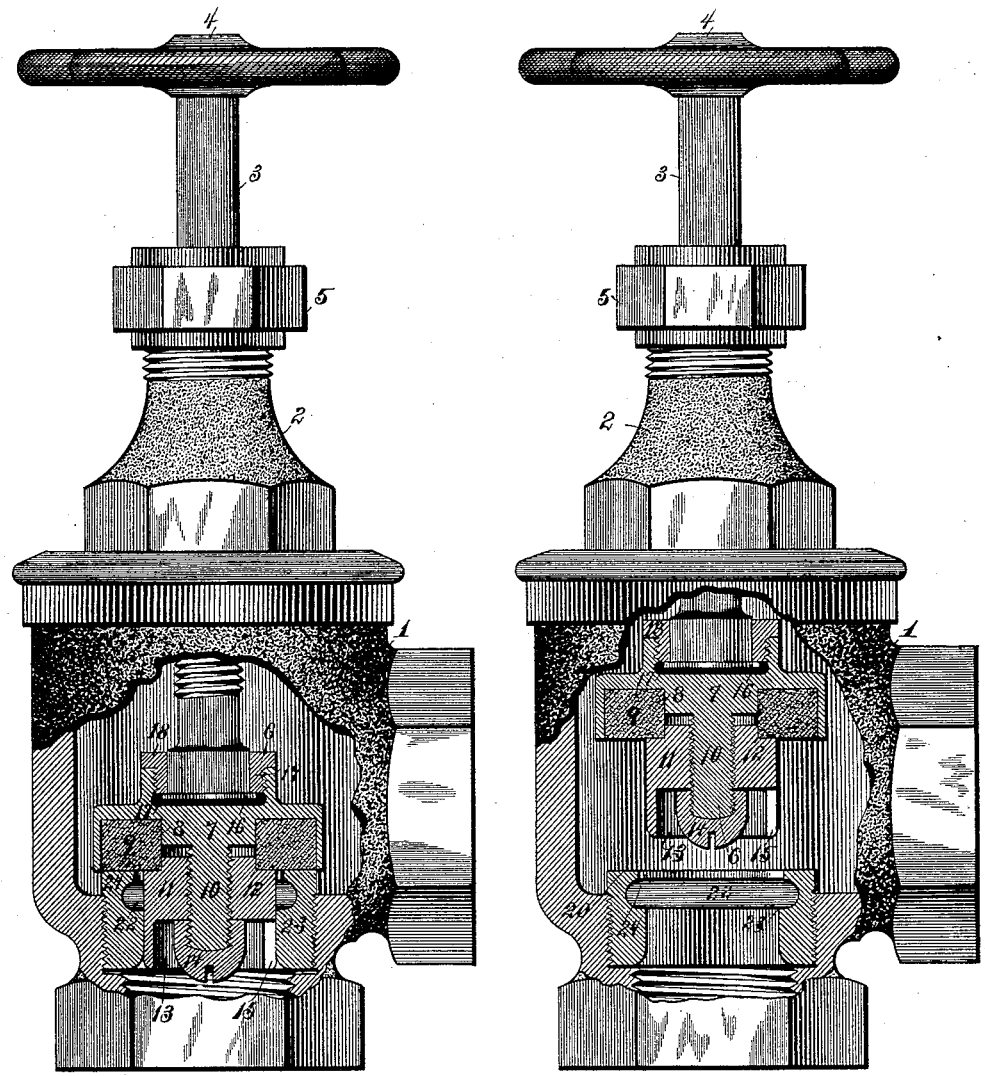
Figure 3:
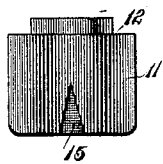

In the accompanying drawings, Figure 1 is a side elevation, partly in section of my invention, showing the valve closed. Fig. 2 is a similar view, showing the valve partly open to illustrate the advantage of the annular chamber surrounding the valve extension. Fig. 3 is a side elevation of the valve extension detached, showing the notch in its apron.

Referring to the figures on the drawings, 1 indicates the shell or case of my device, illustrated with octagonal side and bottom pieces for screwing it upon a pipe in the usual manner.

2 indicates a suitable bearing part, provided as usual with internal screw-threads for carrying an externally screw-threaded valve-stem 3, which may be raised or lowered by rotating the handle 4. Any suitable means, however, for raising and lowering the stem may be substituted for those illustrated.

5 indicates a packing joint, of usual construction, for rendering the case steam tight around the stem. Attached to the lower end of the stem is a valve, which preferably consists of a body part 6, provided on one side with an annular groove or recess 8, within which is seated a suitable packing ring 9 of any suitable material.

10 indicates an externally screw-threaded projection that carries an internally screw-threaded valve extension 11, provided with an annular bench 12 that engages the sides of the packing-ring and holds it in place.

13 indicates an apron projecting from the bottom of the valve extension. The valve extension and apron constitute one piece, and in practice preferably consist of a single casting.

14 indicates a lock-nut for screwing the valve extension in place upon the screw-threaded projection.

15 indicates a notch in one side of the projection. The body part of the valve is revolubly secured to the lower end of the stem by any suitable means, for example as illustrated. For this purpose the stem is provided with an annular flange 16 upon its lower end, and the top of the body part of the valve is provided with a circular recess 17 for its reception.

18 indicates a cap provided with a flange 19 externally screw-threaded on its lower end to enter the internally screw-threaded part of the recess 17.

20 indicates the valve seat, which consists of an annular casting, which, for the purposes of adjustment to wear, is preferably screwed into the body of the case as illustrated. The valve extension and its apron are fitted closely to the inside of the annular valve seat, so as to effect a close joint therewith independent of the joint between the packing-ring and the valve-seat.

22 indicates an annular chamber formed in the inner walls of the valve seat, and forming a cut-off edge 23 at its lower part.

24 indicates an annular passage-way opening upwardly out of the chamber. The outside walls of the valve seat and the inside wall of the recess 17 are in alignment, so that the valve may close down to make a tight joint between the packing ring and the valve seat, notwithstanding any wear which may diminish the thickness of the former.

The operation of my device is as follows:— Suppose the valve to be closed, as indicated in Fig. 1, and the steam to be seeking an entrance into the valve case from the opening in the bottom thereof, the operator rotates the handle and separates the valve from its seat. Let it be observed that the cut off edge 23 projects above the bottom of the valve-extension, and consequently above the top of the notch 15 in the apron. Consequently by the time the point of the notch is raised to allow the passage of steam through it, the packing-ring will have been separated by a considerable distance from the valve seat. As soon as the point of the notch rises above the cut-off edge in the valve-seat, steam will pass through the narrow orifice thereby afforded into the chamber 22, and thence into the interior of the valve-casing. As it enters the chamber it will expand and pass out into the case with less force than it would were it admitted as usual directly between its valve and its seat. Therefore, by reason of the fact that before the steam begins to issue at all, the bearing parts of the valve are well separated; that after the steam begins to flow its force is modified; and that injurious wearing of the valve, which tends to produce leakage and is expensive in ordinary valves is practically reduced to a minimum.

I have illustrated and described but one notch in the apron of the valve extension, but it is only necessary to observe that a plurality of notches may be employed if desired. As, however, it is possible to completely open the valve when desired it will probably be unnecessary in practice to employ more than one notch.

I desire to have it distinctly understood that I do not limit myself to the details of construction and arrangement of the parts herein specified; but claim for myself the right to modify them at will within the scope of my invention.

What I claim is—

The combination with a case, a valve, valve extension and notch therein, a valve seat fixed in the case and surrounding the valve extension to form a joint therewith and with the valve proper, and a cut-off or edge in the wall of the valve seat located beyond the bottom of the valve extension when the valve is closed so as to allow the separation of the valve from its seat before opening the passage way through the valve, substantially as and for the purpose specified.

In testimony of all which I have hereunto subscribed my name.

ROBERT MUNN DIXON.

Witnesses:
 ROBT. P. BROWN,
 OSCAR C. WHITNEY.